(12) United States Patent
Tyler

(10) Patent No.: US 6,953,545 B1
(45) Date of Patent: Oct. 11, 2005

(54) METHOD FOR PRODUCING CONTOURED VEHICLE FLOOR MATS HAVING INTEGRALLY FORMED NIBS

(75) Inventor: Robert D. Tyler, Winfield, KS (US)

(73) Assignee: Winfield Consumer Products, Inc., Winfield, KS (US)

( * ) Notice: Subject to any disclaimer, the term of this patent is extended or adjusted under 35 U.S.C. 154(b) by 0 days.

(21) Appl. No.: 09/409,478

(22) Filed: Sep. 30, 1999

(51) Int. Cl.[7] .............................................. B29V 51/10
(52) U.S. Cl. ................. 264/554; 264/177.1; 264/210.1; 264/334; 264/348
(58) Field of Search ................................. 264/334, 348, 264/554, 177.17, 210.1

(56) References Cited

U.S. PATENT DOCUMENTS

| | | | | |
|---|---|---|---|---|
| 2,623,242 A | * | 12/1952 | Grover | 425/339 |
| 2,915,427 A | * | 12/1959 | Schriner et al. | 154/110 |
| 3,555,601 A | * | 1/1971 | Price | 18/10 |
| 4,828,898 A | * | 5/1989 | Bailey | 428/88 |
| 5,171,619 A | * | 12/1992 | Reuben | 428/95 |
| 5,554,333 A | * | 9/1996 | Fujiki | 264/284 |
| 6,020,044 A | * | 2/2000 | Sugihara | 428/85 |

FOREIGN PATENT DOCUMENTS

JP  01159234 A  *  6/1989

* cited by examiner

Primary Examiner—Edmund H. Lee
(74) Attorney, Agent, or Firm—Shook Hardy & Bacon

(57) ABSTRACT

A method of producing contoured vehicle floor mats having integrally formed nibs. The sheet is formed by a nib forming roll in an extrusion roll stack having a plurality of indentions. The nibbed sheet is placed onto the thermoform mold with the nibs directed away from the mold. The sheet is heated to a plastic state and stretched over the mold to form a contoured mat shaped to vehicle within a vehicle compartment, trunk or cargo area. The nibs on the underside of the mat contacts the floor covering and prevents the mats from sliding on the interior surface of the vehicle.

18 Claims, 2 Drawing Sheets

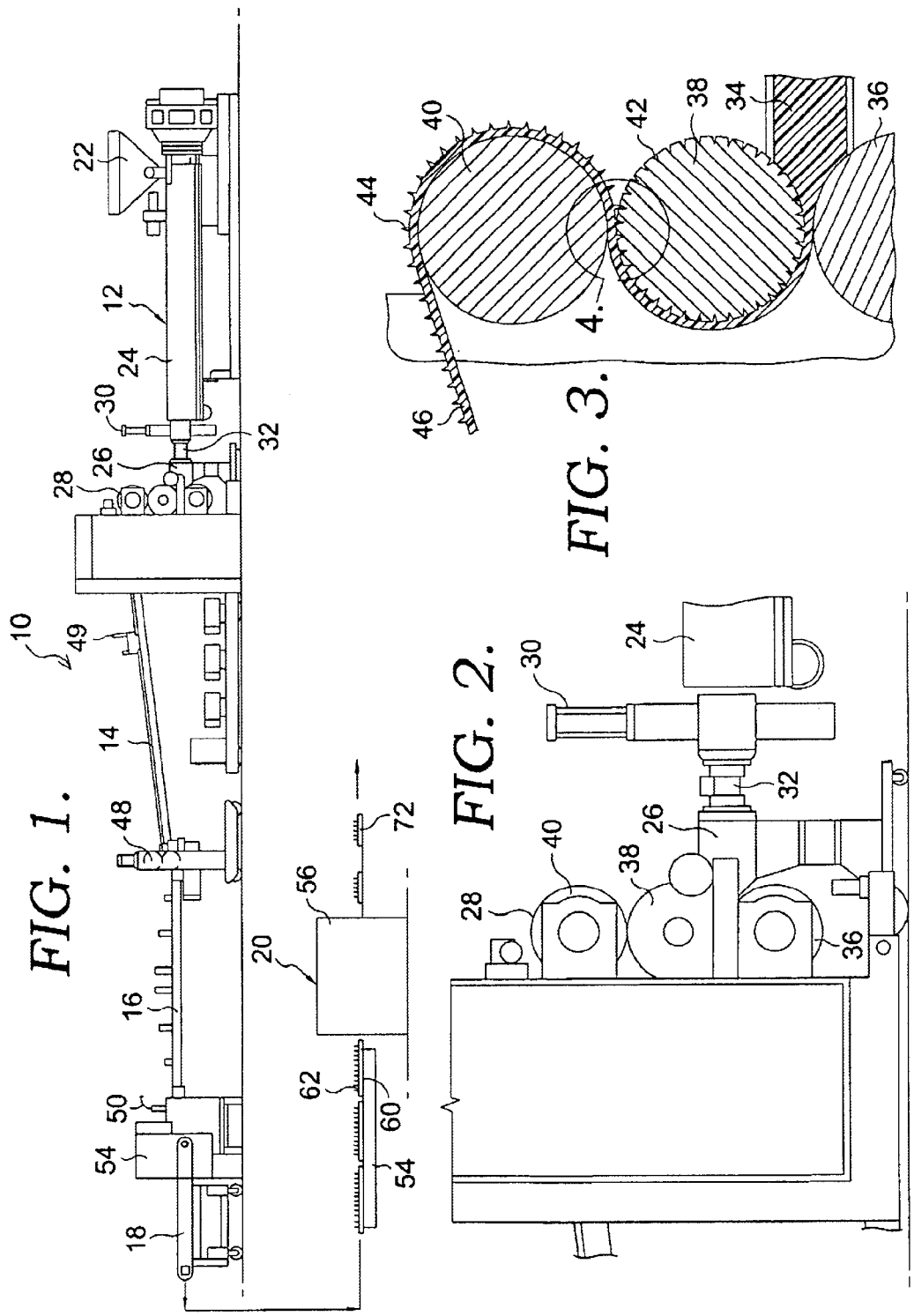

METHOD FOR PRODUCING CONTOURED VEHICLE FLOOR MATS HAVING INTEGRALLY FORMED NIBS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates generally to a method for manufacturing plastic floor mats for vehicles. More specifically, the invention relates to a method for manufacturing plastic floor mats molded to correspond with the three dimensional profile of the interior of a vehicle floor and having a plurality of integrally molded nibs on the surface of the mats to contact the vehicle's floor covering.

Mats are often placed over the floor board of a vehicle to protect the floor covering. Particularly, mats are useful to prevent the carpet or other floor covering from becoming worn, stained or otherwise damaged by the occupants of the vehicle or items stored within the vehicle.

Protective vehicle mats come in a variety of shapes and sizes. One typical prior art mat is a mat constructed from a flat sheet made of fabric, rubber or plastic material. The mats are typically flexible and are laid across the floor board surface of the vehicle. One drawback of these type of mats is that they tend to slide across the floor board due to the forces applied by the passengers of the vehicle or by the motion of the vehicle itself. One prior art solution to this problem is to apply protrusions such as nibs to the surface of the mats contacting the floor board. Typically, the nibs are formed as small spikes with pointed ends that grip the floor board surface of the vehicle. The nibs are generally equally distributed across the underlying surface to provide a number of individual contact areas. The main drawback of these flat mats is that they do not effectively cover the contoured surfaces of the floor board. Specifically, the flat mats are not effective for protecting the corners of the vehicle floor board or those areas having more complex surface shapes. Further, even those flat floor mats having nibbed surfaces tend to move along the floor board since the nibs are not in contact with the large, contoured area of the floor board and do not benefit from the lateral support afforded contoured mats.

Some prior art mats are produced to closely correspond to the shape of a vehicle floorboard and overcome the problems inherent with flat sheets. The complementary shape of the contoured mat mates with the vehicle floorboard to hold the mat into place. However, the prior art processes for producing these contoured mats have a number of shortcomings. One prior art process is the use of thermoforming to produce a multi-dimensional, contoured mat. In this process, a polymer sheet is placed over a solid molding from defining the shape of the mat. The sheet is softened by heating in an oven and is held to the form by either vacuum or air pressure forcing the sheet against a female or male tool. However, while this prior art method has been effective for forming appropriately shaped mats at a relatively low cost, the prior art thermoforming processes do not disclose a method for forming integral nibs on the mat. In some cases, manufacturers have attached a plate having a nibbed surface to the bottom of the thermoformed mat as part of a secondary operation. Typically, the plate is secured to the mat by a mechanical means or by one of a variety of adhesives. Besides requiring an additional step, the mats formed in this manner typically only have nibs on the lower, flat portion of the mat surface. The contoured portion of the mats, such as the upwardly extending sidewalls of typical floorboards are left smooth and do not grip the floor covering of the vehicle. Also, in some situations, the fixed plate may either become loose or partially separated from the contoured mat.

Some prior art processes have produced integrally formed nibs on the underside of a contoured mat. One example of such a process is injection molding. In this method, molten material is injected into the cavity and cooled to form the final part. In another process, used primarily with rubber mats, the mat is compression molded within a closed mold placed under pressure. However, these processes are particularly, if not prohibitably, costly. Accordingly, a process is needed that allows nibs to be integrally formed within a multi-dimensional, contoured mat without the costs associated with these expensive prior art techniques.

BRIEF SUMMARY OF THE INVENTION

It is an object of the present invention to provide a method for producing contoured vehicle mats having integrally formed nibs that is significantly less costly than prior art methods.

A further object of the present invention is to provide a method for manufacturing plastic vehicle floor mats having integrally formed nibs using a thermoforming process.

Another object of the invention is to provide a process for forming contoured floor mats having integrally formed nibs by using an extrusion process to form the nibs and a thermoforming process to provide the contour to the mats.

According to the present invention, the foregoing and other objects are achieved by extruding a thermoplastic material through a roll stack having a roll having a plurality of indentions for forming nibs. The heated material is pressed onto the surface of the central roller by an adjacent roller so that material fills the indentions to form nibs on one side of the sheet. As the sheet is pulled from the central roller, the integrally formed nibs are released from the indentions. Next, the sheets are cooled and cut into blanks for forming the mats. The blanks are placed within a thermoforming station with the nibbed side of the blank directed away from the surface of the molding tool. The blank is heated to a plastic state and drawn toward the contoured tool by vacuum pressure. Thereafter, the blank is stretched over the tool to form the contoured shape desired for the particular vehicle. Thus, a contoured, plastic vehicle mat having integrally formed nibs on the underside of the mat is produced using the thermoforming process.

Additional objects, advantages and novel features of the invention will be set forth in part in the description which follows, and in part will become apparent to those skilled in the art upon examination of the following, or may be learned from practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWINGS

A preferred embodiment of the present invention will be described below with reference to the attached drawing, wherein:

FIG. 1 is an elevational schematic view of the vehicle mat production line according to the present invention;

FIG. 2 is an enlarged, partial side elevational view of the extruder of the present invention;

FIG. 3 is an enlarged, fragmentary side elevation view of the extruding rollers of the present invention;

DETAILED DESCRIPTION OF THE INVENTION

Figure 4:
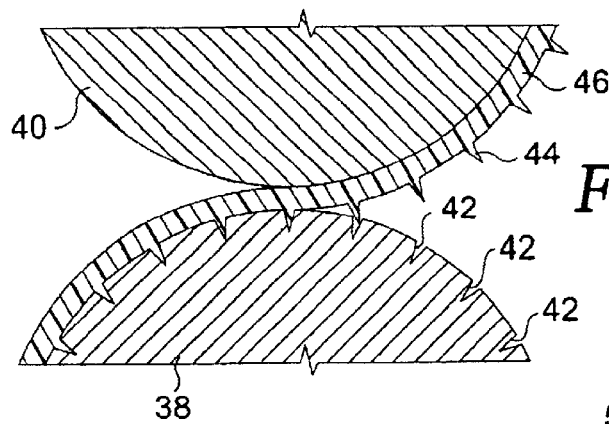
FIG. 4 is an enlarged view of the extrusion rollers within the captured region 4 of FIG. 3.

Referring to FIG. 1, a vehicle mat production line generally designated by the numeral 10 is shown. Specifically, the production line is directed to a method for manufacturing plastic vehicle mats having a contoured, multi-dimensional shape. Nibs or similar structures are integrally formed on the underside of the mats to prevent the mats from slipping on the surface of the vehicle covered by the mats. The mats may be placed in the driver floorboard, the passenger floorboard, or the backseat floorboard. Furthermore, the mats may serve as cargo liners and be formed to fit the trunk of an automobile or the storage area of a van, truck, or sport utility vehicle.

The vehicle mat production line 10 includes an extruder 12, a first conveyer 14, a second conveyor 16, a run-out table 18 and a thermoforming station 20. Generally, the nibs are integrally formed in the mat material at the extruder 16 and the form fitting contour is molded at the thermoforming station 20.

With additional reference to FIG. 2, the extruder 12 includes a feed hopper 22, an extrusion barrel 24, a die 26 and a roll stack 28. Generally, feed material in the form of pellets or granules is placed within feed hopper 22. The feed material is a combination of a linear low density polyethylene material and one of a group of thermoplastic elastomeric (T.P.E. or T.P.O.) materials. The linear low density polyethylene material enhances melt strength in thermoforming process and increase wearability (or durability) of the floor liner. A linear low density polyethylene material sold by Phillips Petroleum under the name K203 is used. The thermoplastic material is one of a group of thermoplastic elastomers. Most preferably, the thermoplastic elastomers is either a blend of polypropylene and EPDM rubber or a blend of polypropylene, EPDM rubber and EVA. For example, two particular blends of polypropylene and EPDM rubber are sold by the Advanced Elastomers Systems, Akron, Ohio, under the names VYRAM and SANTOPRENE. An example of an effective blend of polypropylene, EPDM rubber and EVA is sold by the same company under the name VISTAFLEX. In the most preferred embodiment, the feed material is a blend constituting 60% of the K203 low density polyethylene and 40% of the VYRAM thermoplastic elastomer. The examples of thermoplastic elastomers are representative, and various other thermoplastic elastomers having similar melt strength and other physical characteristics may be advantageously used in the part forming process. Similar, blends having various ratios of low density polyethylene and thermoplastic elastomer material may be used without departing from the scope of the invention.

The feed material slides downwardly from the feed hopper 22 and into the extrusion barrel 24. In the barrel, a screw (not shown) heats the material until the plastic reaches a homogenous fluid state. With the preferred material blend discuss above, the extrusion occurs at a temperature between 395–420 degrees Fahrenheit and at a pressure between 1800–2400 psi. With additional reference to FIG. 2, the screw forces the material through a screen pack 30 located at the end of the barrel. The screen pack 30 filters the plastic material and supplies back pressure to the material remaining in the extrusion barrel 24. Next, the plastic material is forced through a valve die adaptor 32 and finally through an orifice (not shown) in die 26. The shape of orifice of the die 26 defines the cross sectional profile of the material exiting the barrel 18. Heretofore, the extrusion process discussed above is conventional in the art of plastic extrusion processes.

With reference to FIG. 3, once the extruded material 34 exits the die 26, it enters the roll stack 28 of the present invention. The roll stack 28 is comprised of lower roll 36, a central nib-forming roll 38 and an upper roll 40. The lower roll is generally smooth (or is minimally textured) and rotates in a first rotated direction. As shown in FIG. 4, the nib-forming roll 38 has a plurality of indentions 42. Each indention 42 has a tapered sidewall that define a small cavity. The sidewalls meet to form a rounded or sharply pointed end at the bottom of the indentions. The indentions 42 are preferably spaced equally from one another to create an equal dispersion pattern of nibs in the sheet. However, the indentions may be formed in any of a variety of geometric configurations. For instance, in some embodiments, it may be desirable to have a higher concentration of nibs along the periphery of the sheet to enhance gripping at the more contoured surfaces of the vehicle surface.

To form the nibs, the extruded material 34 is pressed between the lower roll 36 and nib forming roll 38. The material 34 is pushed into the form of a mat sheet 46 due to the pressure between the rolls 36 and nib forming roll 38 which rotates in a second direction opposite from lower roll 36. As the mat sheet 46 is formed, some of the thermoplastic material is forced into and fills the indentions 42 of nib forming roll 38. With still further reference to FIG. 4, as the mat sheet 46 rolls around nibbed roller 38, the nibs 44 remain in the indentions 42 until the upper roll 40 pulls the mat sheet 46 from the nib forming roll. As the mat sheet 46 is spooled onto upper roll 40, rotating in the direction opposite from nibbed roll 38, the nibs 44 are released from the indentions in the nib forming roll 38.

Figure 5:
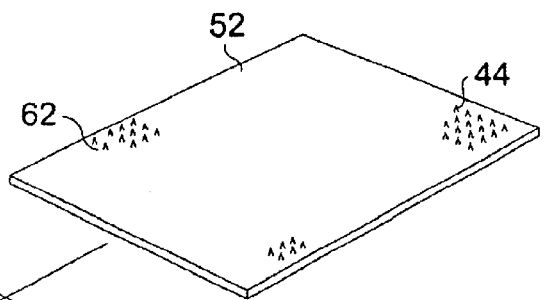
FIG. 5 is a perspective view of the thermoforming molding tool of the present invention.

Next, the mat sheet 46 is directed along the inclined first conveyor 14. The conveyor is driven by a conventional pull roll 48. At this stage in the production line 10, the mat sheet is sheared along its edges by a shear cutter 49 to define a mat sheet of constant width. Moreover, the sheet 46 cools as it proceeds down the first conveyor 14. Next, the mat sheet 46 travels along the second conveyor 16. At the end of the generally horizontal second conveyor 16, the sheet 46 is forced downwardly by a pneumatic hold down 50. The mat sheet 46 is sheared into mat blanks 52 at the shear table 54. At this point, the mat blanks 52 are removed from the run out table 18 of the first stage of the production line 10. As shown in FIG. 5, the mat blanks 52 may be sized to produce a single mat or may be of an appropriate size to be simultaneously molded into a number of mats.

With reference now FIGS. 1 and 5, the thermoforming component of the vehicle mat production line 10 is shown. The thermoforming station 20 generally includes a loading station 55, an oven 56 and a mold 58 located within the oven 56. The blanks 52 are placed on the conventional loading station 54 and transported into the oven 56. In the novel method of the present invention, the mat blank 52 is loaded on the loading station 54 so that smooth (or slightly textured) side 60 is directed toward the mold 58 and the nibbed side 62 is directed in the direction opposite the mold. Next, the mat blank 52 is placed directly over the mold 58. The mold 58 is preferably a male tool contoured to shape the vehicle surface to be covered by the mat. The mold 58 has a block-like base 64, an upstanding form 66 on the upper surface of the base 64 and a flat peripheral ledge 68 between the outer edge on the form 66 and the edge of the base 64. In the preferred embodiment, the form 66 includes upwardly extending sidewalls 70 and a top 71. As would be understood, the form 66 may take any of a wide variety of complex shapes have a plurality of curved, flat and transitional surfaces typical of the interior floorboards of passenger vehicles, and cargo areas of a variety of trucks, vans and sport utility vehicles.

Figure 6:
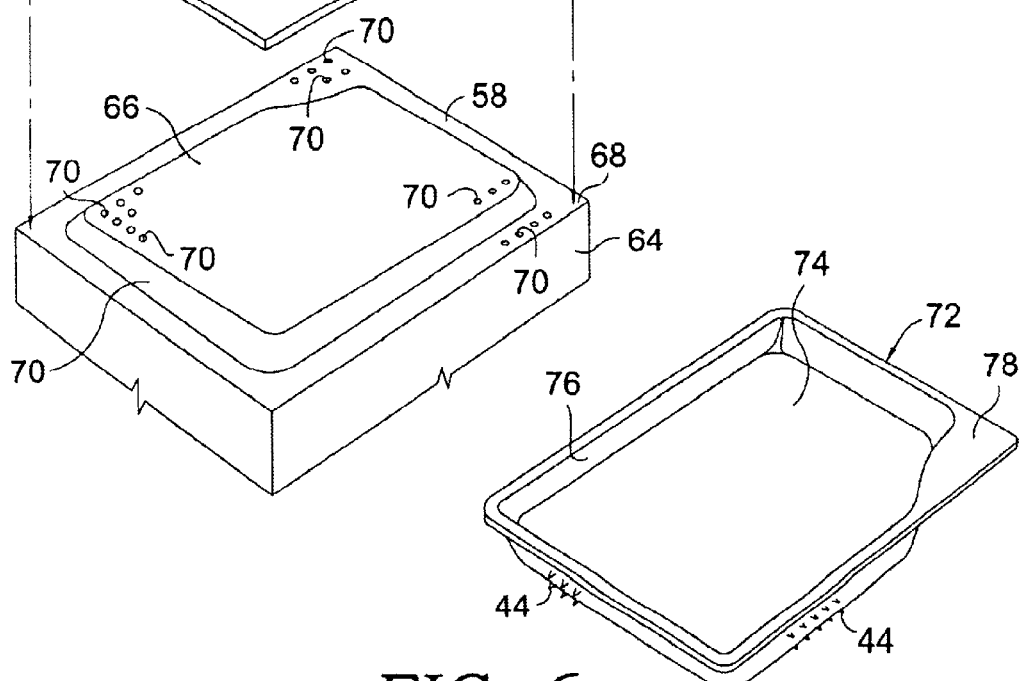
FIG. 6 is a perspective view of a vehicle floor mat made in accordance with the present invention.

The mold 58 includes a plurality of vacuum apertures 72 formed thereon. To form the mat blank 52 into the formed mat 73, the blank 52 is heated by the oven 56 and the negative vacuum pressure applied through vacuum apertures 72 draws the blank toward the mold 58. While the preferred embodiment relies solely on vacuum pressure, the inventive technique also contemplates methods of utilizing differential pressure to force the blank into contact with the mold (i.e pressure or a combination of pressure and vacuum). The hot plastic blank 52 is pulled in contact and held against the surface of the mold 58. The plastic cools to form the mat 73 shown in FIG. 6. Then, the mats 73 are removed from the mold. If necessary, the outer periphery of the mats may be trimmed to confirm the mat to the shape of the vehicle surface to be covered.

In the preferred embodiment, the mat 73 has a relatively flat base 74 and a number of upstanding sidewalls 76 shaped by the upstanding form 66 and against ledge 68. As mentioned before, this shape is merely illustrative of a typical driver or passenger side floor board, and a number of differently shaped mats, such as cargo liners, may be formed according to this inventive process.

The process of the present invention is particular well-suited for producing vehicle mats. However, parts suitable for different applications may be produced by thermoforming nibbed sheets in accordance with the thermoforming process of the present invention. Furthermore, the use of thermoplastic blend, particularly the preferred blend, allows the nibs to be formed by an extrusion roller and produces a sheet ideally suited for the thermoforming process of the present invention.

The inventive method overcomes the problems of prior art thermoforming processes by placing the nibs into a sheet of material prior to thermoforming, and directing the nibs in the direction opposite the male tool. The inventive method of thermoforming contoured plastic vehicle mats from sheets having integrally formed nibs is advantageous for a number of reasons. First, the only processes previously known for forming such shapes involve complex tooling such as cavity molds that greatly increase the price of the product to the consumer. The other processes for incorporating nibs onto a contoured mat involve mechanically or adhesively fastening a sheet of nibs to the underside of the mat. In addition to adding an extra step in manufacturing and the problems associated therewith, it was difficult to place nibs entirely across the lower surface of the mat. In the method of this invention, not only are the nibs capable of being formed on all of the surfaces of the mats, the nibs are directed in the direction substantially perpendicular to the surface and are extremely effective for gripping the interior surfaces of the vehicle. Furthermore, the process allows nibbed mats to be formed in a infinite variety of shapes at a relatively low cost. Further, mats may be formed to completely line and cover the vehicle floorboards and cargo areas while tightly gripping those surfaces with the dispersed pattern of nibs formed throughout the mat.

While preferred embodiments and particular applications of this invention have been shown and described, it is apparent to those skilled in the art that many other modifications and applications of this invention are possible without departing from the inventive concepts herein. It is understood that substitutions may be made and equivalents employed herein without departing from the scope of the invention as recited in the claims.

What is claimed is:

1. A method of producing a vehicle mat comprising the steps of:

providing a sheet of thermoplastic material, said sheet having a first and second side, said second side having a plurality of nibs extending therefrom;

placing said sheet directly over a contoured molding tool having one or more sidewalls that extend upwardly from a base and a top surface, said first side directed toward said sidewall and top surface of said tool and said second side directed away from said tool;

heating said sheet; and drawing said heated sheet toward said tool until said sheet is substantially shaped to the contour of said sidewall and said top surface of said tool, wherein a portion of said heated sheet shaped to the contour of said sidewall of said tool has said second side with a portion of the plurality of nibs extending therefrom arranged such that said portion of the plurality of nibs extend in a different direction than another portion of the plurality of nibs extending from said second side of another portion of said heated sheet shaped to the contour of said top surface of said tool.

2. The method of claim 1, wherein said thermoplastic material is a thermoplastic elastomer.

3. The method of claim 1, wherein said sheet is drawn toward said tool by differential pressure.

4. The method of claim 1, wherein at least one vacuum aperture is formed in said tool, and wherein said sheet is drawn toward said tool by applying vacuum pressure through said vacuum aperture.

5. The method of claim 1, wherein said sheet is blank for producing at least one mat.

6. The method of claim 1, further comprising the steps of cooling said sheet and removing said sheet from said tool.

7. A method of producing a plastic vehicle mat comprising the steps of:

extruding a sheet of thermoplastic material between a pair of rollers wherein one of said rollers has a plurality of indentions to form nibs on a first side of the sheet;

placing said sheet directly over a contoured male molding tool having one or more sidewalls that extend upwardly from a base and a top surface, said first side directed away from said tool;

heating said sheet to a plastic state; and drawing said heated sheet toward said tool until said sheet is substantially shaped to the contour of said sidewall and said top surface of said tool, wherein a portion of said heated sheet shaped to the contour of said sidewall of said tool has said second side with a portion of the plurality of nibs extending therefrom arranged such that said portion of the plurality of nibs extend in a different direction than another portion of the plurality of nibs extending from said second side of another portion of said heated sheet shaped to the contour of said top surface of said tool.

8. The method of claim 7, wherein said thermoplastic material is a thermoplastic elastomer.

9. The method of claim 8, wherein said thermoplastic elastomer is a blend of a linear low density polyethylene and thermoplastic elastomers.

10. The method of claim 7, wherein said sheet is drawn toward said tool by vacuum pressure.

11. A method of producing a part comprising the steps of:
providing a sheet of thermoplastic material, said sheet having a first and second side, said second side having a plurality of nibs extending therefrom;
placing said sheet directly over a contoured molding tool having one or more sidewalls that extend upwardly from a base and a top surface, said first side directed toward said sidewall and top surface of said tool and said second side directed away from said tool;
heating said sheet; and
drawing said heated sheet toward said tool until said sheet is substantially shaped to the contour of said sidewall and said top surface of said tool, wherein a portion of said heated sheet shaped to the contour of said sidewall of said tool has said second side with a portion of the plurality of nibs extending therefrom arranged such that said portion of the plurality of nibs extend in a different direction than another portion of the plurality of nibs extending from said second side of another portion of said heated sheet shaped to the contour of said top surface of said tool.

12. The method of claim 11, wherein said thermoplastic material is a thermoplastic elastomer.

13. The method of claim 11, wherein said thermoplastic material is a blend of a linear low density polyethylene and a thermoplastic elastomer.

14. The method of claim 11, wherein said sheet is drawn toward said tool by differential pressure.

15. The method of claim 11, wherein said vacuum pressure is applied through vacuum apertures in said tool.

16. The method of claim 11, further comprising the steps of cooling said sheet and removing said sheet from said tool.

17. The method of claim 1, wherein the steps of heating said sheet and drawing said heated sheet toward said tool are performed within an oven.

18. The method of claim 1, wherein said portion of said heated sheet shaped to the contour of said sidewall of said tool has said portion of the plurality of nibs extending from said second side thereof in a direction substantially perpendicular thereto, and wherein said another portion of said heated sheet shaped to the contour of said top surface of said tool has said another portion of the plurality of nibs extending from said second side thereof in a direction substantially perpendicular thereto.

* * * * *